United States Patent
Guevara et al.

[19]

[11] Patent Number: 6,015,137
[45] Date of Patent: Jan. 18, 2000

[54] APPARATUS FOR SUSPENDING AND TRANSPORTING TOILETS

[76] Inventors: Edward Guevara, 6200 NW. 3 St.; Pedro Izquierdo, 6201 NW. 3 St., both of Miami, Fla. 33126

[21] Appl. No.: 09/220,242

[22] Filed: Dec. 23, 1998

[51] Int. Cl.[7] .................................................. B66D 1/00
[52] U.S. Cl. ......................... 254/323; 254/325; 269/17; 29/281.4
[58] Field of Search .................................... 254/323, 324, 254/325, 376, 380; 29/281.4; 269/17

[56] References Cited

U.S. PATENT DOCUMENTS 5,203,065  4/1993  Peters ..................................... 29/281.4

*Primary Examiner*—Donald P. Walsh
*Assistant Examiner*—Emmanuel M. Marcelo
*Attorney, Agent, or Firm*—J. Sanchelima

[57] ABSTRACT

An apparatus for lifting and transporting toilets with a wheeled C-shape assembly that has a hoist assembly mounted thereon. The hoist assembly includes a ratcheted spool assembly with an off-centered axle and a central axle that, when they rotate, take in a strap simultaneously from both ends. The strap ends are releasably attached to two separate attachment points in a toilet. One of the attachment points utilizes the openings typically found in the rear portion of a toilet where the toilet seat assembly is typically fastened. The other point uses the inwardly recessed rim found in conventional toilets.

8 Claims, 3 Drawing Sheets

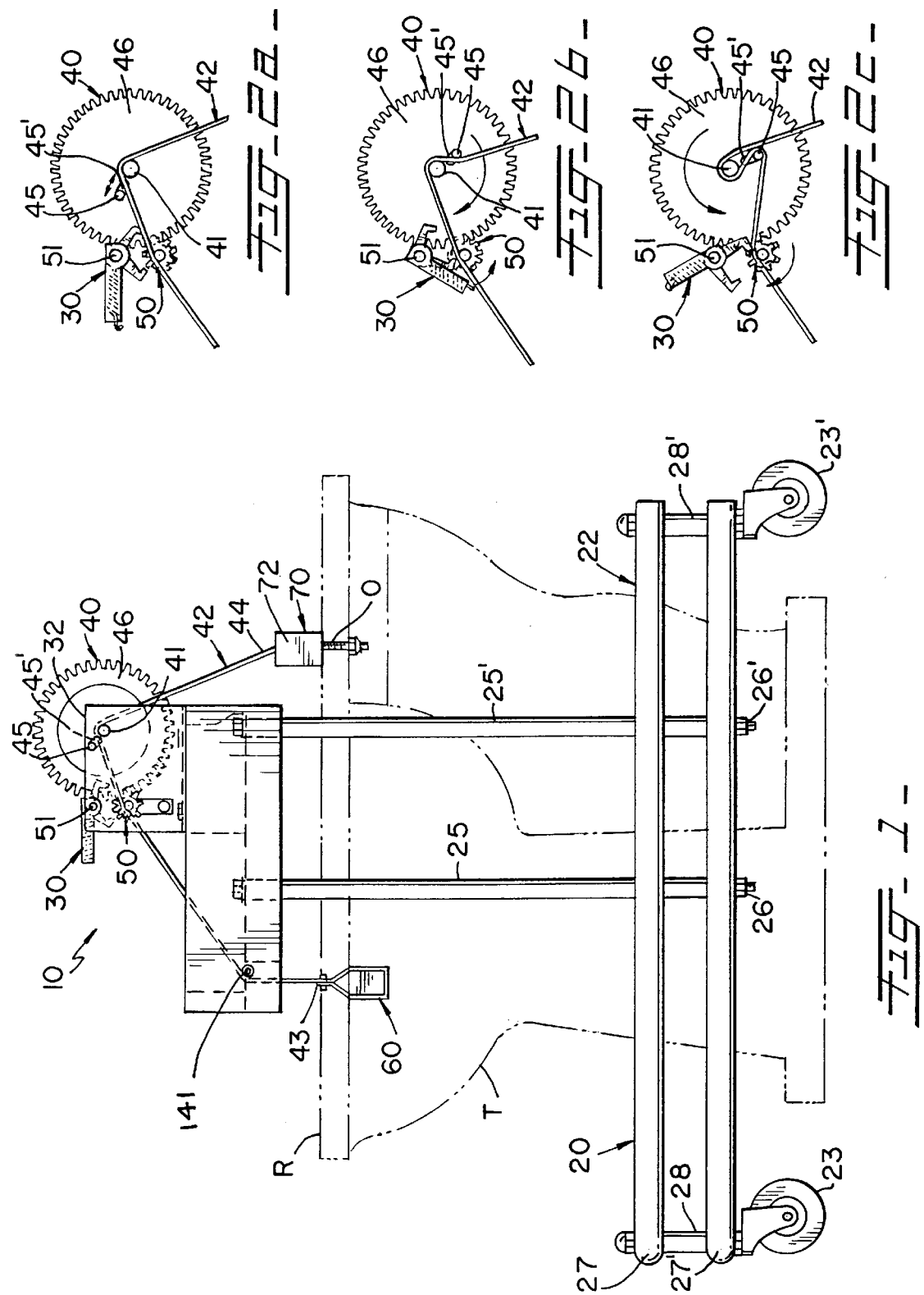

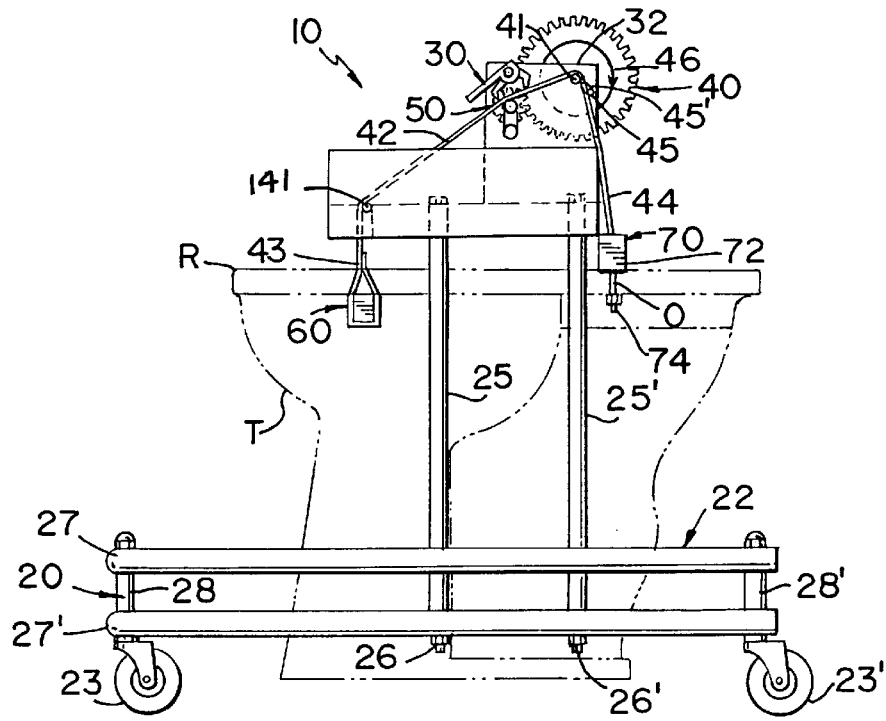
Fig-3-
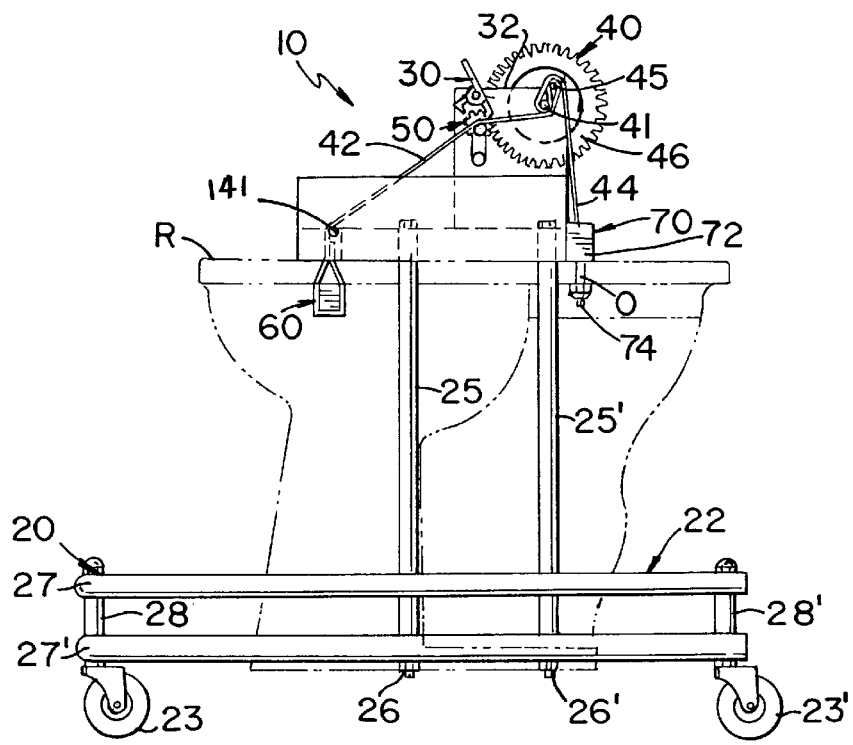
Fig-4-

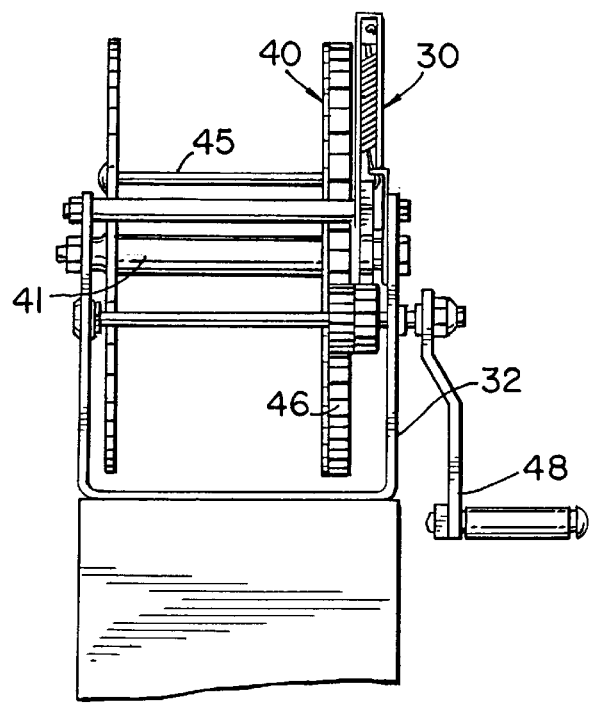
Fig_5.
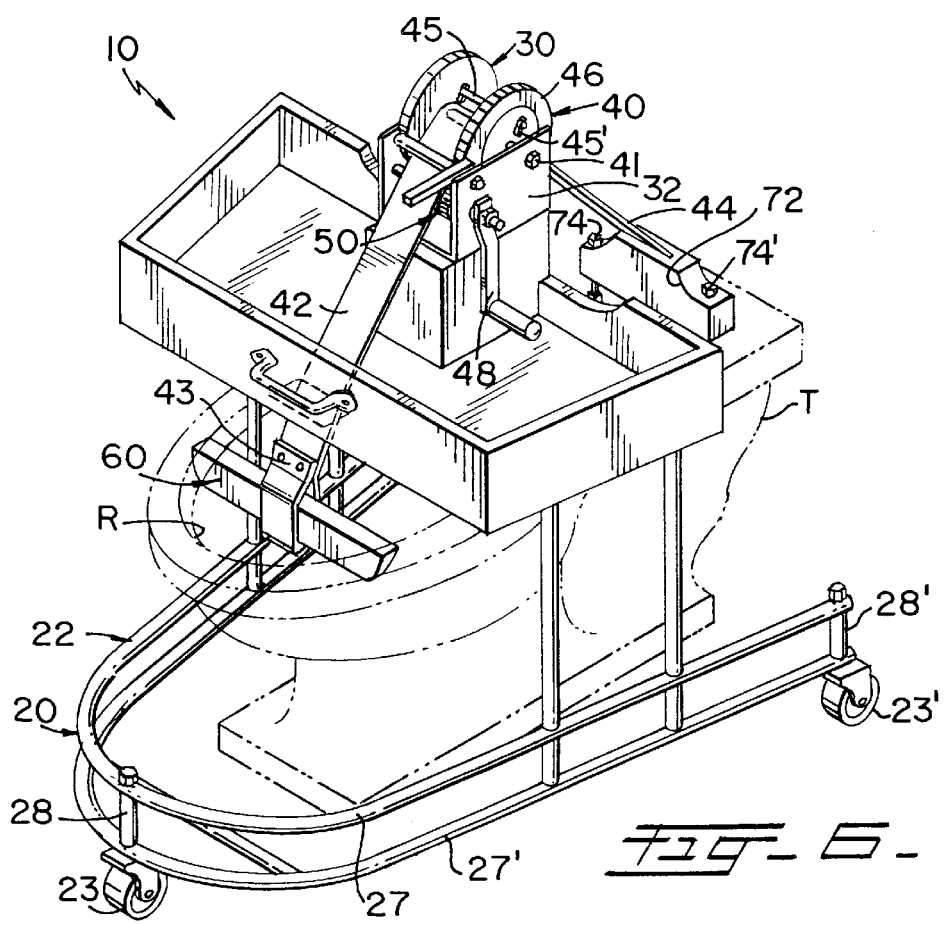
Fig_6.

APPARATUS FOR SUSPENDING AND TRANSPORTING TOILETS

BACKGROUND OF THE INVENTION

1. Field of the Invention.

The present invention relates to a tool for installing and transporting toilets.

2. Description of the Related Art.

Applicant believes that the closest reference corresponds to U.S. pat. No. 5,203,065 issued to Peters in 1993 and entitled Toilet Fixture Installation Apparatus. The patented apparatus uses gripping fingers 19 to lift the toilet with a relatively complicated mechanism. Also, there is no teaching of a mechanism for lifting a toilet from two separate points and substantially horizontally. Other features claimed in this application provide for an apparatus with marked advantages over Peters' patented invention.

Other patents describing the closest subject matter provide for a number of more or less complicated features that fail to solve the problem in an efficient and economical way. None of these patents suggest the novel features of the present invention.

SUMMARY OF THE INVENTION

It is one of the main objects of the present invention to provide an apparatus for suspending and transporting toilet fixtures reliably.

It is another object of this invention to provide a tool for aligning a suspended toilet with the openings typically made prior to installation/replacement so that a user can easily bring the toilet to the desired position.

It is still another object of the present invention to provide a tool that can easily transport toilets. Additionally, the present invention can be used as a tool to urge toilets that are being unmounted upwardly.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 1 represents a side elevational view of one of the preferred embodiments for the present invention with a toilet fixture in phantom.

FIG. 2a shows the hoist assembly at its initial position and off centered pin not in contact with the strap.

FIG. 2b represents the hoist assembly after being rotated clockwise causing off centered pin to come in contact with the strap and taking in part of it while causing the strap below to approach vertical alignment as toilet T is brought forward.

FIG. 2c illustrates the hoist assembly after being rotated counter-clockwise and off-centered pin taking in the portion of the strap closest to the ratchet assembly first and subsequently the portion of the strap closer to toilet T.

FIG. 3 shows a side elevational view of the preferred embodiment with the toilet fixture brought in below the hoist assembly from its original position in FIG. 1.

FIG. 4 represents a side elevational view of the preferred embodiment with the toilet fixture already lifted.

FIG. 5 is a partial front detail elevational view of the hoist assembly.

FIG. 6 is an isometric view of one of the preferred embodiments of the present invention.

DETAILED DESCRIPTION OF THE PREFERRED EMBODIMENT

Referring now to the drawings, where the present invention is generally referred to with numeral 10, it can be observed that it basically includes a wheeled chassis assembly 20 with hoist assembly 30 rigidly mounted thereon. Hoist assembly 30 includes spool assembly 40 with strap 42 with two ends 43 and 44. Ends 43 and 44 include front and rear attachment assemblies 60 and 70 that are removably attached to the toilet T to be transported. Hoist assembly 30 includes ratchet mechanism 50. Apparatus 10 permits a user to lift and transport toilet T with minimum effort.

Wheeled assembly 20 has C-shape tubular assembly 22 with an underside provided with pivotally mounted wheel assemblies 23, 23', and 23" that permits the movement of the assembly in any direction. The open end of C-shape tubular assembly 22 permits a user to bring toilet T in position adjacent to walls, which is typically where toilets T are installed.

In the preferred embodiment, C-shaped tubular assembly 22 includes upper and lower symmetrical tubular members 27 and 27', mounted at a spaced apart relationship with respect to each other by spacer members 28, 28', and 28" that are preferably positioned to coincide with wheel assemblies 23, 23', and 23", respectively. Elongated tubular members 25 and 25' extend upwardly with lower ends 26 and 26' mounted to members 27 and 27'.

Hoist assembly 30 is rigidly mounted to wheeled assembly 20 through elongated tubular members 25 and 25'. Hoist assembly 30 includes support structural members 32 for suspending spool assembly 40. Spool assembly 40 includes strap 42 with ends 43 and 44. Strap 42 rests over central axle 41 of spool assembly 40 initially, as shown in FIGS. 1 and 2a. When spool member 46 is rotated, off-centered axle 45 comes in contact with strap 42, as seen in FIGS. 2b and 3, when rotated clockwise. Strap 42, at this point, is tensed causing it to pass through slot 141 to approach a vertical orientation that will ensure uniform and equal horizontal lifting. Off centered axle 45 moves along slot 45' on spool member 46. The purpose being to make strap 42 taut as spool member 46 is rotated in one direction taking up any slack. Then, spool member 46 is rotated counter clockwise, as shown in FIGS. 2c and 4, and both ends are taken in simultaneously, so that toilet T is lifted substantially in horizontal position.

Ratchet mechanism 50 is cooperatively mounted to spool assembly 40 to permit the rotation of spool member 46 in one direction only, unless it is released to rotate freely about per 51. Crank handle 48 is used to transmit the necessary rotational force to spool assembly 40, as shown in FIG. 5. A motorized crank can also be implemented with an electric battery powered motor, if desired.

Toilet T is removably attached to ends 43 and 44 through front and rear attachment assemblies 60 and 70, respectively. Front attachment assembly 60, in the preferred embodiment as best seen in FIG. 6, is implemented with a block made of wood with a substantially rectangular cross-section. Assembly 60 has cooperative dimensions to permit its insertion below inwardly recessed rim R found in most toilets T. Assembly 60 is pushed against the walls of the bowl of toilet T immediately below rim R. These walls narrow towards the front of toilet T.

Assembly 70, as best seen in FIG. 6, includes block 72 also of substantially rectangular cross-section and provided with fastening members 74 and 74' that are cooperatively positioned to penetrate through opening O found in the typical toilet fixture to support the seat assembly (removed).

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. An apparatus for transporting toilets having a rear end with openings and a bowl with an inwardly recessed rim, comprising:

A) a wheeled chassis having a C-shape tubular member and at least one elongated structural member mounted thereon;

B) a hoist assembly mounted to said elongated structural member, said hoist assembly including a spool member with a central axle and an off-centered axle, a strap trained over said central axle and further including first and second ends having respectively, first and second attachment means for releasably securing said toilet at two attachment points and said strap is taken in by winding it over said central and off centered axles so that said toilet is lifted substantially horizontally and transported to a desired location.

2. The apparatus set forth in claim 1 further including releasable ratchet means for causing said spool member to rotate in one direction only.

3. The apparatus set forth in claim 2 wherein said hoist assembly includes means for directing said strap downwardly.

4. The apparatus set forth in claim 3 wherein said hoist assembly includes a tray.

5. The apparatus set forth in claim 4 wherein said first attachment means includes a first block member with fastening means that cooperatively engage with openings in a toilet rear end.

6. The apparatus set forth in claim 5 wherein said second attachment means includes a second block member that removably engages with the inwardly recessed rim in a toilet bowl.

7. The apparatus set forth in claim 6 wherein said hoist assembly includes crank means for rotating said spool member.

8. The apparatus set forth in claim 7 wherein said crank means includes a handle.

* * * * *